US008202579B2

(12) United States Patent
O'Keefe et al.

(10) Patent No.: US 8,202,579 B2
(45) Date of Patent: Jun. 19, 2012

(54) WATER-RESISTANT FABRICS AND METHODS OF PREPARATION THEREOF

(75) Inventors: Michael S. O'Keefe, East Greenwich, RI (US); Justin J. Silvia, Fall River, MA (US); David A. Pettey, Westport, MA (US)

(73) Assignee: Cooley Group Holdings, Inc., Pawtucket, RI (US)

( * ) Notice: Subject to any disclaimer, the term of this patent is extended or adjusted under 35 U.S.C. 154(b) by 1115 days.

(21) Appl. No.: 12/059,566

(22) Filed: Mar. 31, 2008

(65) Prior Publication Data
US 2009/0246391 A1    Oct. 1, 2009

(51) Int. Cl.
*B05D 3/02* (2006.01)
*C08K 5/3415* (2006.01)
*C08K 5/05* (2006.01)
*C08K 5/07* (2006.01)
*C08K 5/16* (2006.01)

(52) U.S. Cl. ............. 427/385.5; 524/104; 524/210; 524/356; 524/379; 524/462

(58) Field of Classification Search .............. None
See application file for complete search history.

(56) References Cited

U.S. PATENT DOCUMENTS

| | | |
|---|---|---|
| 2,749,956 A | 6/1956 | Eldred |
| 2,854,049 A | 9/1958 | Wyllie |
| 2,950,484 A | 8/1960 | Jaffe |
| 3,716,599 A * | 2/1973 | Vasta et al. ............ 525/124 |
| 4,365,049 A | 12/1982 | Tsunoda et al. |
| 4,390,585 A | 6/1983 | Holden |
| 4,804,572 A | 2/1989 | Bodrogi |
| 5,115,947 A | 5/1992 | McDonnell et al. |
| 5,164,252 A | 11/1992 | Henning et al. |
| 5,429,437 A | 7/1995 | Shaw et al. |
| 6,075,003 A | 6/2000 | Haq et al. |
| 6,166,127 A * | 12/2000 | Tomko ............ 524/507 |
| 6,309,752 B1 | 10/2001 | Dams et al. |
| 6,475,616 B1 * | 11/2002 | Dietz et al. ............ 428/355 AC |
| 7,036,676 B2 | 5/2006 | Christensen |
| 7,244,371 B2 | 7/2007 | Fang et al. |
| 7,259,115 B2 | 8/2007 | Panse |
| 7,306,851 B2 | 12/2007 | Panse |

FOREIGN PATENT DOCUMENTS

| | | |
|---|---|---|
| EP | 1311637 | 4/2006 |
| EP | 1783119 A1 | 9/2007 |

OTHER PUBLICATIONS

Bayer MaterialScience LLC, Product Index, "Aliphatic Isocyanates, Products and Properties," (9 pages) (2006).
Bayer MaterialScience LLC, Product Index, "Aromatic Polyisocyanates and Prepolymers, Products and Properties," (9 pages) (2006).
Bayer MaterialScience LLC, "The Chemistry of Polyurethane Coatings, A General Reference Manual," (31 pages), (2005).

(Continued)

*Primary Examiner* — John J Figueroa
(74) *Attorney, Agent, or Firm* — Lando & Anastasi, LLP

(57) ABSTRACT

A composition having a polyurethane, a hydrophilic polyisocyanate, a wetting agent, and a fluoropolymeric additive can be disposed on a substrate such as a fabric to provide water-repellant characteristics. The urethane-coated substrate can then be fabricated into a water storage container.

19 Claims, 4 Drawing Sheets

OTHER PUBLICATIONS

Bayer MaterialScience LLC, "Dispercoll U 53—Aqueous Polyurethane Dispersion," Product Information, 2 pages, (2002).

Bayer Polymers, "Desmodur I—Isophorone Diisocyanate," (28 pages) (2002).

Bayer Polymers, "Desmodur N—Hexamethylene Diisocyanate Based Polyisocyanates," 20 pages) (2002).

Bayer MaterialScience LLC, "Sticks. Maximum initial strength. Dispercoll U," 8 pages, (2005).

Bayer MaterialScience LLC, "Dispercoll U Polyurethane Dispersions," General Information on Properties and Compounding for Adhesive Applications, 19 pages, (2005).

Dormish, "Polyisocyanate Crosslinkers for Waterborne Polymers," 19 pages (2001) Bayer Corporation.

The Dow Chemical Company, Sales Specification, Zoldine XL-29SE Crosslinker, printed Feb. 25, 2008.

The Dow Chemical Company, Material Safety Data Sheet, Zoldine XL-29SE Crosslinker, 9 pages, (printed Feb. 25, 2008).

Polymer Science Learning Center, Department of Polymer Science, The University of Southern Mississippi, "Making Polyurethanes," 2005 (6 pages).

Bayer, MaterialScience, Dispercoll Product Datasheet, Dispercoll U 53, Aug. 22, 2007 (2 pages).

E.I. du Pont de Nemours and Company, DuPont Zonyl 9360 Soil Repellant Additive, 2002 (2 pages).

Dormish, et al., "Tack Measurement of Heat-Activated Polyurethane Adhesives," Polyurethanes 2004, Oct. 18-20, 2004, pp. 467-475.

E.I. du Pont de Nemours and Company, "DuPont Foraperle 321/325 Fluorinated Acrylic Copolymer, Treatment of Paper for Food Packaging," 6 pages, 2003.

E.I. du Pont de Nemours and Company, DuPont Zonyl Fluoroadditives for Coating Technical Information, 4 pages, 2003.

* cited by examiner

WATER-RESISTANT FABRICS AND METHODS OF PREPARATION THEREOF

BACKGROUND OF THE DISCLOSURE

1. Field of the Disclosure This disclosure relates to water-resistant fabrics, methods of preparation of water-resistant fabrics, and water-resistant fabrics utilizing modified urethane-based compositions.

2. Discussion of Related Art

Coatings or compositions applied on fabrics or flexible materials have been disclosed. For example, Henning et al., in U.S. Pat. No. 5,164,252, disclose hydrophobizing and oleophobizing compositions containing a polymer containing perfluoroalkyl groups and a cationically modified polyurethane. Haq et al., in U.S. Pat. No. 6,075,003, disclose fabric laundry treatment compositions comprising a fluorocarbon polymer, a fluorocarbon copolymer, or mixtures thereof; and a deposition aid comprising a cationic softening compound, a polymeric delivery aid, or mixtures thereof such that if the deposition aid is a cationic fabric softening compound, the ratio of the deposition aid to the fluorocarbon polymer, copolymer, or a mixture thereof, is greater than 2:3. Dams et al., in U.S. Pat. No. 6,309,752, disclose compositions comprising a fluorochemical agent, a copolymer extender, and a blocked isocyanate extender; and substrates treated therewith that possess high initial water repellency and laundry durable water repellency. Fang et al., in U.S. Pat. No. 7,244,371, disclose compositions that provide repellency, durability, and soil release properties when applied to a textile or fabric; the composition has a repellent component, a hydrophilic resin component, a soil release component, and a cross-linking component. Savu et al., in European Patent Specification No. EP 1 311 637, disclose polymerized fluoroalkyl methacrylate compositions and coatings of such copolymers that provide anti-stiction or anti-migration properties.

Particular fluorinated polymers have been disclosed. For example, Tsunoda et al., in U.S. Pat. No. 4,365,049, disclose a fluoroalkyl acrylate copolymer and a composition containing the copolymer.

Further, collapsible or portable liquid vessels or tanks have been disclosed. For example, Eldred, in U.S. Pat. No. 2,749,956, discloses a collapsible portable water tank. Wyllie, in U.S. Pat. No. 2,854,049, discloses collapsible storage tank intended for use in fire-fighting or as a swimming pool; the collapsible storage tank for liquids has an endless inflatable tube attached by a flexible side wall to the base of the tank. Jaffe, in U.S. Pat. No. 2,950,484, discloses a foldable, waterproof tub or receptacle which can be used as a bath tub. Shaw et al., in U.S. Pat. No. 5,429,437, discloses a collapsible, self-expanding liquid container with a bottom and a generally vertical annular or conical wall attached to a perimeter of the bottom to form a container with a large open top; the bottom and wall are composed of a flexible, liquid impermeable material. Christensen, in U.S. Pat. No. 7,036,676, discloses a foldable water tank with a foldable receptacle having a bottom wall and inwardly inclined sidewalls, and a plurality of structures connected to and supporting the sidewalls. McDonnell et al., in U.S. Pat. No. 5,115,947, disclose a collapsible water tank suitable for use in combating forest fires; the tank is formed from a flaccid synthetic material or a coated fabric.

Panse, in U.S. Pat. No. 7,259,115, discloses curable extruded adhesive laminate systems for manufacturing collapsible structures. Further, Panse, in U.S. Pat. No. 7,306,851, discloses patch repair systems for collapsible fuel and water tanks.

SUMMARY OF THE DISCLOSURE

Some aspects of the present disclosure relate to urethane-based coating compositions. One or more embodiments of the urethane coating composition can comprise at least one water-dispersible urethane polymer, at least one hydrophilic polyisocyanate, at least one wetting agent comprising at least one water-miscible organic compound, and at least one water-repellent fluoropolymeric additive. The at least one wetting agent can consist essentially of or comprise N-methyl-2-pyrrolidone. The at least one wetting agent can consist essentially of or comprise a polar solvent selected from the group consisting of halogenated organics compounds, alcohols, ketones, and formamides. The at least one water-repellent additive can consist essentially of or comprise a fluoroalkyl acrylate polymer. The at least one hydrophilic polyisocyanate can consist essentially of or comprise an aliphatic polyisocyanate adduct of hexamethylene diisocyanate.

Other aspects relate to methods of preparing urethane-based coating compositions. One or more embodiments of the methods of the present disclosure can comprise combining at least one aqueous polyurethane dispersion, water, and at least one polar aprotic compound to form a premix; adding at least one polyisocyanate to the premix to form a urethane-based mixture; and mixing at least one fluoroacrylic polymeric compound into the urethane-based mixture to form the urethane-based coating compositions. In some embodiments, the method can comprise storing the premix prior to performing the act of adding the at least one polyisocyanate to the premix. Combining the at least one aqueous polyurethane, water, and the at least one polar aprotic compound can comprise combining a polyester polyurethane, water, and N-methyl-2-pyrrolidone. Adding the at least one polyisocyanate to the premix can comprise at least one of introducing the premix into a mixer, agitating the premix, and adding at least one aliphatic polyisocyanate adduct of hexamethylene diisocyanate, preferably while agitating the premix.

Still other aspects relate to methods of fabricating laminates. One or more embodiments of the methods of fabricating laminates can comprise applying at least one urethane coating composition on a fabric, or a plurality of fabric layers, curing the at least one coating composition on the fabric to provide a coated fabric, and disposing at least one thermoplastic polymeric material on the coated fabric to create a laminate. The at least one urethane coating composition can consist of, consist essentially of, or comprise at least one water-dispersible urethane polymer, at least one hydrophilic polyisocyanate, at least one wetting agent comprising at least one water-miscible organic compound, and at least one water-repellent fluoropolymeric additive. Applying the coating composition can consist essentially of or comprise an act of dipping the fabric in a bath containing the coating composition to form a dip-coated fabric. Curing the at least one coating composition can consist of or comprise at least one act selected from the group consisting of drying the dip-coated fabric at a temperature in a range of from about 200° C. to about 400° C., and heating the dried, coated fabric at a temperature of at least 400° C. Applying the at least one coating composition can comprise applying a saturant consisting essentially of at least one aqueous anionic polyurethane, water, N-methyl-2-pyrrolidone, at least one aliphatic polyisocyanate adduct of hexamethylene diisocyanate, and at least one water-repellent fluoroacrylic polymeric additive. Disposing the thermoplastic polymeric material on the coated fabric can consist of or comprise an act of co-extruding a thermoplastic polyurethane resin on the coated fabric.

In accordance with still other aspects, the present disclosure relates to methods of facilitating fabrication of water storage tanks. The methods can consist essentially of or comprise acts of applying a saturant consisting essentially of an aqueous anionic polyurethane, water, N-methyl-2-pyrrolidone, an aliphatic polyisocyanate adduct of hexamethylene diisocyanate, and a water-repellent fluoroacrylic polymeric additive on a fabric; curing the saturant on the fabric to provide a coated fabric; and disposing a thermoplastic polymeric material on the coated fabric to create a laminate. In others embodiments, the method of facilitating fabrication of the water storage vessel can further comprise delivering the laminate to a water storage vessel fabrication facility.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

In the drawings.

DETAILED DESCRIPTION

Figure 1:
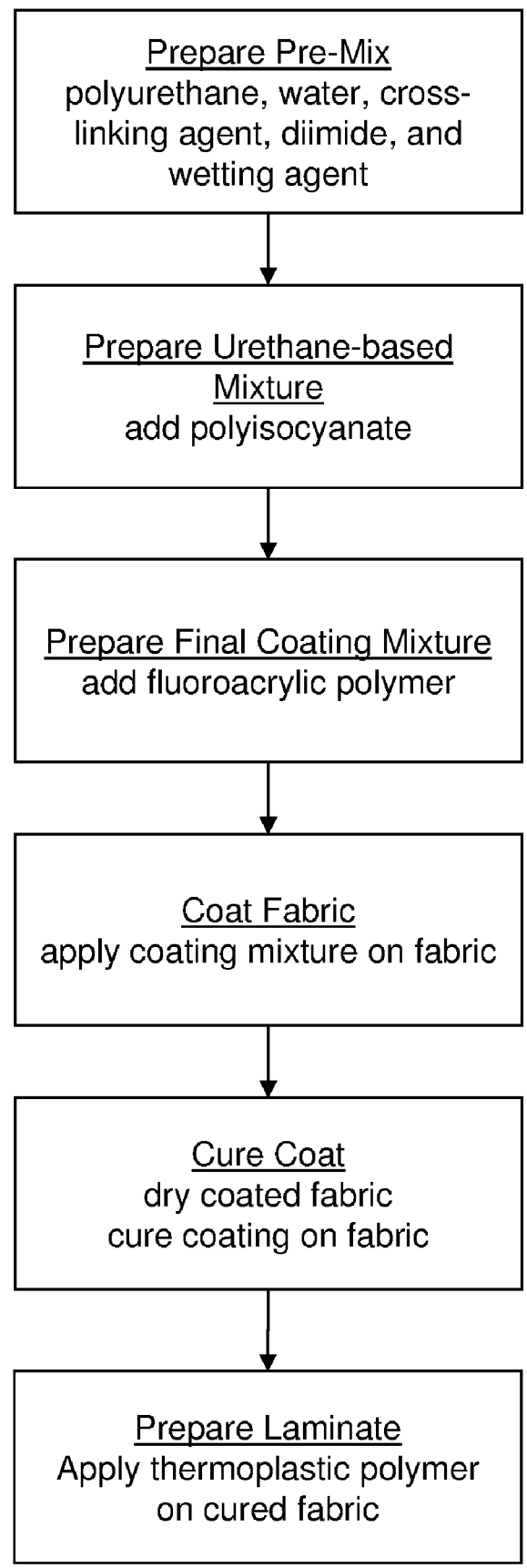
FIG. 1 is a flow chart illustrating a process in accordance with one or more embodiments of the present disclosure.

The present disclosure relates to modifying a property of a substrate and, in some particular cases, to increasing the water-repellency of at least a portion of the substrate. Some particular aspects of the present disclosure relate to coating compositions on a variety of substrates or surfaces. Other aspects thereof relate to methods of preparing, for example, urethane-based coating composition that renders or modifies a property or characteristic of the substrate. Still other aspects thereof relate to methods of fabricating laminates or layered structures. Further aspects of the present disclosure relate to methods of facilitating fabrication of water storage tanks or liquid-containing vessels, such as fabric or cloth based water tanks.

Any substrate can be modified by utilizing the various compositions and techniques disclosed herein. For example, the substrate to be modified can be an ordered or random arrangement of fibers, including, but not limited to woven or aggregated, synthetic or natural, fibers as well as cellulose-based composites such as paper and fiberboard. In some cases, the substrate can comprise a plurality of differing layers or a composite material having one or more layers of any of synthetic or natural fibers or cellulosic materials.

Some further aspects of the present disclosure are directed to providing water-repellency to substrates by utilizing water-based substrate coating compositions. Other aspects can involve modifying the water-repellent characteristics of substrates by utilizing hydrophilic saturant compositions.

In accordance with one or more aspects, the modifying compositions of the present disclosure can be directed to saturants, such as but not limited to those based on urethane. The saturants can comprise at least one aqueously dispersed polyurethane compound, at least one wetting agent or emulsifying compound, at least one polyisocyanate compound, and at least one halogenated acrylic or halogen-containing acrylate species. The saturant, in some cases, can further comprise at least one cross-linking agent that, preferably, can react with a functional group in any of the other components. Any of the herein disclosed saturants can further comprise an expedient amount of a carrier or solvent, such as water.

The one or more saturants of the present disclosure can comprise from about 60 wt % to about 75 wt % of at least one polyurethane dispersion, from about 4 wt % to about 12 wt % of at least one wetting agent, from about 2.5 wt % to about 7.5 wt % of at least one polyisocyanate compound, from about 5 wt % to about 15 wt % of at least one halogenated acrylic compound. The amount of the cross-linking agent in the various saturants of the present disclosure can range from about 1 wt % to about 15 wt %. Higher cross-linking agent concentrations may reduce flexibility of the resultant laminate or cured, coated fabric, which can reduce the resultant tear resistance and puncture resistance.

The amount of each of the saturant components may be varied to achieve a desired characteristic of the coated substrate, the laminate, or both. For example, the amount of the at least one aqueously dispersed polyurethane compound can be varied to provide a desired thermal stability or characteristic of the saturant-coated substrate. Other considerations may involve the viscosity of the saturant to facilitate the application, or wetting, of the saturant on the substrate.

The amount of the polyisocyanate component of the one or more saturants of the present disclosure can be relative to the amount of the at least one polyurethane dispersion. For example, the amount of the at least one polyisocyanate component can proportionately, e.g., stoichiometrically, vary based on the amount of the aqueous polyurethane dispersion. However, non-stoichiometric ratios of aqueous polyurethane dispersion to polyisocyanate may be utilized in one or more saturants of the present disclosure to, for example, promote cross-linking of the polyurethane as well as, in some cases, the one or more halogenated acrylic or acrylate components of the saturants.

The amount of the halogenated acrylic or acrylate component can also be tailored to provide one or more desirable characteristics of any of the saturant and saturant-coated substrates of the present disclosure. For example, the at least one halogenated acrylic component can be about 10 wt %, as at least one fluorinated acrylic compound. Although the present disclosure is not limited to the herein disclosed compositions, it is believed that higher concentrations of the halogenated acrylic components may reduce the adhesion properties of the saturant or coating on the substrate. Further, it is believed that lower concentrations of the halogenated acrylic components may not sufficiently provide desirable modifying properties.

At least one of the laminates of the present disclosure can have one or more coatings on at least one side or surface thereof that can be represented by the formula (I):

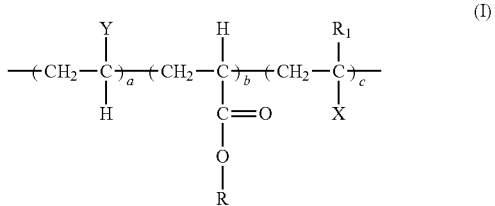

wherein R is typically an alkyl group, $R_1$ is typically hydrogen or a methyl group, X is typically a halogen or a halogenated group, such as chlorine, fluorine, $CONH_2$, $COOCH_2CH(OH)CH_2Cl$, or $CONHCH_2OH$, and Y can be a haloalkyl such as a fluoroalkyl represented by the formula (II):

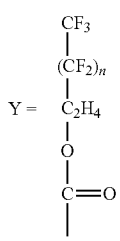

with a, b, c, and $n \leq 1$.

Non-limiting examples of the polyurethane dispersion that may be utilized include those commercially available from Bayer MaterialScience AG, Leverkusen, Germany, marked as DISPERCOLL® dispersion, such as DISPERCOLL® U 53 aqueous polyurethane dispersion. Other polymeric urethanes may be utilized. Indeed, a mixture of polyurethane dispersions may be utilized in various saturants or coating compositions disclosed herein.

Non-limiting examples of the one or more polyisocyanate compounds that may be utilized in one or more embodiments herein include aliphatic and aromatic polyisocyanate such as those commercially available from Bayer MaterialScience AG as marked as DESMODUR® polyisocyanate such as DESMODUR® DA-L aliphatic isocyanate.

Non-limiting examples of the one or more halogenated acrylic or acrylate compounds can include fluorinated acrylic and polyfluorinated acrylate species such as those commercially available from CAL Chemical Corporation, Coventry, R.I., sold under the brand name CALPEL FC-LV fluoroacrylic.

Any of the urethane-based coating compositions or saturants of the present disclosure can comprise a water-dispersible urethane polymer, a hydrophilic polyisocyanate, a wetting agent comprising at least one water-miscible organic compound, and a water-repellent fluoropolymeric additive. The wetting agent can be, consist essentially of, or comprise N-methyl-2-pyrrolidone. In other cases, the wetting agent can consist essentially of or comprise a polar solvent selected from the group consisting of halogenated organics compounds, alcohols, ketones, and formamides.

Where advantageous, the water-repellent additive can consist essentially of or comprise a fluoroalkyl acrylate polymer.

In particular cases, the hydrophilic polyisocyanate can consist essentially of or comprise an aliphatic polyisocyanate adduct of hexamethylene diisocyanate.

In accordance with still further advantageous embodiments of the present disclosure, the one or more saturant compositions of the present disclosure can comprise one or reactive compounds that have moieties that can react or promote cross-linking of an available functional group of any of the at least one polyurethane compounds, the at least one fluorinated polymeric compounds, the substrate, and at least one moiety comprising the at least one thermoplastic polymeric layer. For example, one or more saturants of the present disclosure can comprise at least one cross-linking agent that comprises at least one functional group that can react with a carbonyl group. In particular, one or more saturants of the present disclosure can comprise at least one cross-linking agent comprising at least one of a diimide and an alkylazo compound that can react with any of the utilized one or more polyurethane dispersions and polyacrylic compounds. Non-limiting commercially available examples of the cross-linking agents include ZOLDINE™ XL-29SE polycarbodiimide cross-linking agent from The Dow Chemical Company, Midland, Mich. and CARBIDILITE™ multifunctional polycarbodiimide cross-linking agent from Nisshinbo Industries, Inc., Tokyo, Japan.

In preferred embodiments of the present disclosure, the saturant can comprise at least one aqueously-dispersed polyurethane, at least one dipolar aprotic solvent, such as any of dimethylformamide, dimethylacetamide and dimethyl sulfoxide, at least one polyisocyanate compound, at least one haloalkylated polymer, and a diimidic compound. In other preferred embodiments of the present disclosure, the saturant can consist of or consist essentially of water, N-methylpyrrolidone, a fluoralkylated acrylic polymer, a carbodiimide, a polyisocyanate adduct of hexamethylene diisocyanate, a water-dispersible urethane polymer, and a carbodiimide.

FIG. 1 exemplarily provides acts or steps that can be utilized to fabricate any of the various articles of the disclosure.

The urethane-based coating compositions can be prepared by combining at least one aqueous polyurethane dispersion, water, and at least one polar aprotic compound to form a premix. Where utilized, at least one cross-linking agent may be added to form the premix. At least one polyisocyanate compound can be also added to the premix to form urethane-based mixtures of the present disclosure. At least one fluoroacrylic polymeric compound can then be mixed with any of the urethane-based mixtures of the present disclosure to form the various urethane-based coating compositions of the present disclosure. Where advantageous, at least a portion of the premix can be stored prior to performing adding the at least one polyisocyanate compound thereto. This can reduce waste associated with unused saturant compositions.

In other embodiments of the present disclosure, the one or more acts of combining the at least one aqueous polyurethane, water, and the at least one polar aprotic compound can comprise combining one or more polyester polyurethanes, water, and N-methyl-2-pyrrolidone. In still other embodiments of the present disclosure, adding the polyisocyanate to the premix, in any one or more acts, can comprises at least one of introducing the premix into a mixer, agitating the premix, and adding an aliphatic polyisocyanate adduct of hexamethylene diisocyanate, with or without agitating the premix.

Fabrication of the various laminates of the present disclosure can comprise applying one or more of the coating compositions of the present disclosure on a substrate, such as a fabric, curing the one or more coating compositions disposed on at least one surface of the substrate to provide a coated fabric, and disposing one or more thermoplastic polymeric material layers on one or more surfaces of the coated fabric, to create the laminates of the present disclosure. In some cases, any of the coating compositions of the present disclosure can consist of, consist essentially of, or even comprise one or more water-dispersible urethane polymers, one or more hydrophilic polyisocyanate compounds, one or more wetting agents or one or more emulsifiers, preferably comprising at least one water-miscible organic compound, and one or more water-repellent fluoropolymeric additive.

The one or more acts of applying the coating composition can consist essentially of or comprise one or more acts or instances of dipping the fabric in a bath containing the coating composition to form, for example, a dip-coated fabric. Other techniques beyond dipping and squeezing operations that may be utilized to provide a coated substrate of the present disclosure include, but are not limited to, knife and rod coating, fountain coating, flooded gravure coating, foam coating, and roll coating.

Curing the coating composition can then consist essentially of or comprise at least one act of drying the coated substrate at a temperature in a range of from about 200° C. to about 400° C. In other advantageous embodiments, curing the coating can involve one or more acts of heating the coated or dried, coated fabric at a temperature of at least about 400° C. In some cases, applying the coating composition on at least a portion of the fabric or substrate can comprise applying a saturant consisting essentially of an aqueous anionic polyurethane, water, N-methyl-2-pyrrolidone, an aliphatic polyisocyanate adduct of hexamethylene diisocyanate, a diimide, and a water-repellent fluoro acrylic polymeric additive.

One or more thermoplastic polymeric material layers can be disposed or applied on a surface of the coated fabric by, for example, co-extruding one or more layers of thermoplastic polyurethane on the coated fabric. Subsequent layers thereof can be applied on the first or previously laid thermoplastic material. During coating, such as extrusion coating, it is believed that further reaction can occur between the isocyanate functional groups and the hydroxyl functional groups of the thermoplastic material, and even the one or more cross-linking agents.

In some cases, the layered laminate can be annealed or exposed to a temperature that reduces the likelihood of laminate curling or non-homogeneous distortions. For example, the laminate can be exposed to temperatures of at least about 100° C. for a period that removes anisotropic stress conditions such as internal thermally-induces stresses. Other advantageous techniques can involve cooling the laminate at a controlled rate, optionally under an applied stress which can further reduce curling or tendencies.

Further aspects of the present disclosure relate to methods of facilitating fabrication of a liquid containing vessel. To facilitate fabrication of, for example, a water storage vessel, the one or more fluoro-derived saturants disclosed herein can be applied on a reinforcing substrate, such as a fabric; curing the saturant on the fabric to provide a coated fabric; and disposing a thermoplastic polymeric material on the coated fabric to create a laminate. Facilitating fabrication of the water storage vessel typically further comprises delivering the laminate to a water storage vessel fabrication facility. The coated substrate can thus be considered to comprise a polyurethane-based barrier with at least one fluorinated component that serves to at least partially inhibit saturation by a liquid of a reinforcing substrate. Preferred embodiments of the saturant may involve further providing moieties that can react with components of laminates to provide improved mechanical and other physical properties. Thus, in some embodiments, any one or more of the herein disclosed coatings or saturants can provide moieties that can react or cross-link with the substrate, the applied thermoplastic polymeric material, or both.

EXAMPLES

The function and advantages of these and other embodiments of the present disclosure can be further understood from the examples below, which illustrate the benefits and/or advantages of the one or more systems and techniques of the present disclosure but do not exemplify the full scope of the present disclosure.

Example 1

This example describes the preparation of the coating composition or saturant in accordance with one or more aspects of the present disclosure.

Table 1 below lists the components utilized in a saturant composition, designated as saturant "1" in accordance with some embodiments of the present disclosure.

TABLE 1

Saturant "1" Composition.

| Component | Commercial Designation | Amount (pounds) |
| --- | --- | --- |
| Polyurethane | DISPERCOLL ® U 53 | 228 |
| Carrier | water | 21 |
| Wetting agent | N-methyl pyrrolidone | 30 |
| Polyisocyanate | DESMODUR ® DA-L | 18 |
| Halogenated additive | CALPEL FC-LV | 33 |

Saturant "1" was prepared by mixing the polyurethane and wetting agent in water for about five minutes to create a pre-mix. While the pre-mix was being stirred, the polyisocyanate was added into the vortex; mixing was continued for another five minutes to form a urethane-based mixture. The urethane-based mixture "1" can be stored or used immediately.

While mixing the urethane-based mixture, the halogenated additive was introduced to form saturant "1". This formulated saturant is typically utilized or applied on a substrate within eight hours after preparation. Saturant "1" had a viscosity of about 75 cps and a solids content of about 34%.

Example 2

This example describes the coating and evaluation of substrates in accordance with one or more aspects of the present disclosure.

Several aqueous baths of saturant "1" as prepared in Example 1 were prepared to have concentrations of from about 5 wt % to 10 wt %. Saturant "1" was applied on a satin weave, polyester fabric, 12 oz/yd$^2$, at about 0.625 pounds of saturant per linear yard of fabric, by dip-coating the 1 inch by 8 inch strips of fabric in several baths containing various loadings of saturant "1". The dipped specimens were squeezed through rollers set at nip pressure of about 30 psi. Table 2 lists the saturant "1" concentration in the aqueous dip-coating solution, labeled "A" to "F". The various dip-coated specimens were cured under the indicated conditions.

The coated fabric was dried by exposing in a heating zone with a temperature of about 200° F. and cured to cross-link the urethane-based water repellant saturant in a second heating zone with a temperature of about 350° F. To evaluate the water-wicking characteristics of the coated substrate, the cured, coated 1 inch by 8 inch specimens labeled "A" to "F" were dipped in water having food coloring.

TABLE 2

Saturant "1" Loading and Curing Conditions of Various Specimens.

| | Specimen Label | | | | | |
|---|---|---|---|---|---|---|
| | A | B | C | D | E | F |
| Saturant Loading in Dipping solution, % by weight | 5 | 5 | 7.5 | 7.5 | 10 | 10 |
| Curing Conditions | 2' 30" at 350° F. | 10' at 350° F. | 2' 30" at 350° F. | 10' at 350° F. | 2' 30" at 350° F. | 10' at 350° F. |

Figure 2:
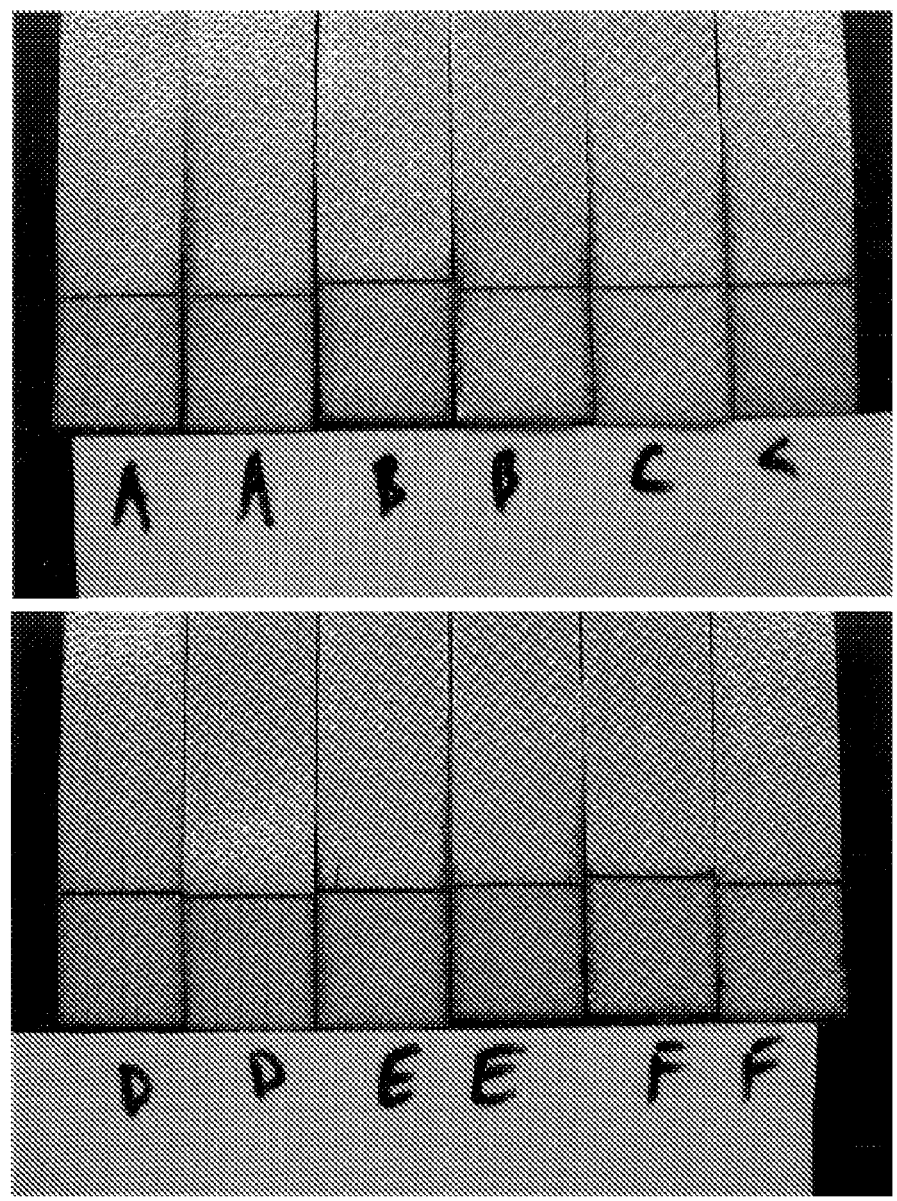
FIG. 2 shows a copy of a photograph of specimens discussed in the examples in accordance with some embodiments of the present disclosure.

FIG. 2 is copy of a photograph of specimens labeled "A" to "F" showing their water-wicking characteristics. The results show improved wicking resistance as represented by the extent of discoloration of the specimens, with increasing effective saturant loading.

Example 3

This example describes the fabrication and evaluation of laminates in accordance with one or more aspects of the present disclosure.

After curing the dip coated fabric, a thermoplastic layer of polyurethane, designated as CRE682, available from Cooley, Inc., Pawtucket, R.I., was extrusion-coated on both sides of the coated, cured fabric labeled "A" to "F". The fabricated laminates were labeled correspondingly. The average results presented in Table 3 were obtained by tests performed in accordance with ASTM D 751; the "1 inch Adhesion" tests utilized 1 inch×8 inch strips of laminates that were welded at 300° F. with at least a 3 inch overlap.

TABLE 3

Test Results of Laminate Specimens "A" to "F".

| | Specimen Label | | | | | |
|---|---|---|---|---|---|---|
| | A | B | C | D | E | F |
| 1 inch Adhesion, lb/linear inch | 27.2 | 36.4 | 25.6 | 46.8 | 27.2 | 47.8 |
| Screw Puncture | 173.3 | 181.4 | 193.0 | 197.2 | 203.3 | 201.1 |

The results show that various embodiments of the laminates of the present disclosure can be utilized to fabricate water tanks.

Example 4

Saturant compositions with a cross-linking agent were prepared according to the formulations listed in Table 4. Satin weave polyester fabrics, with 12.6 oz/yd$^2$ (Cooley, Inc. designation S2126SATIN-67) were separately dip-coated with saturant "X1" and with saturant "X2" at a loading of 10 wt % saturant in an aqueous bath. Each of the dip-coated fabrics was cured for 3 minutes at about 350° F.

Figure 3A:
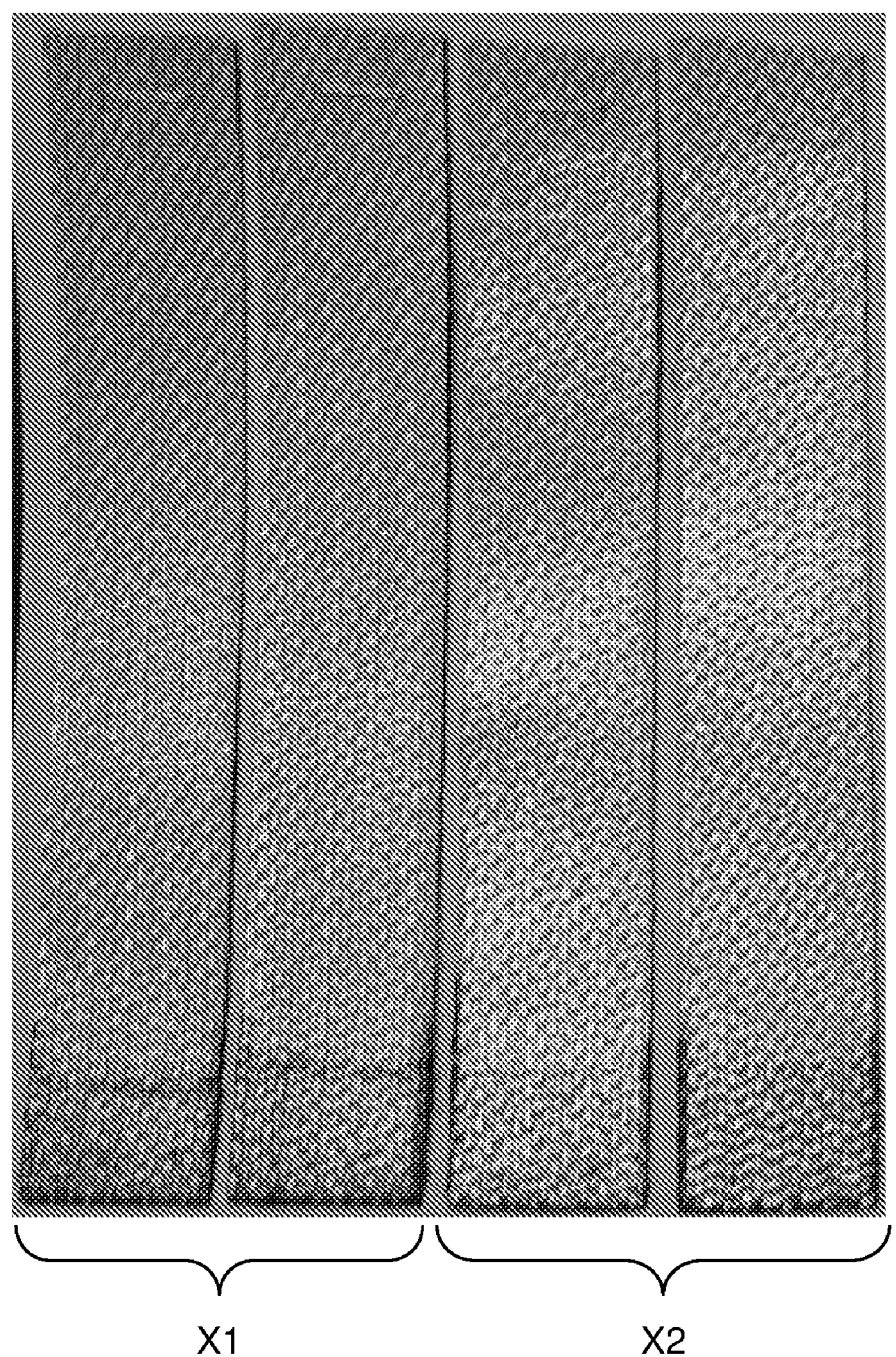
FIG. 3A shows a copy of a photograph of coated specimens, oriented in the warp direction, utilizing saturants in accordance with some aspects of the present disclosure, after water immersion in accordance with sections 94-98 of ASTM D 751-06.
Figure 3B:
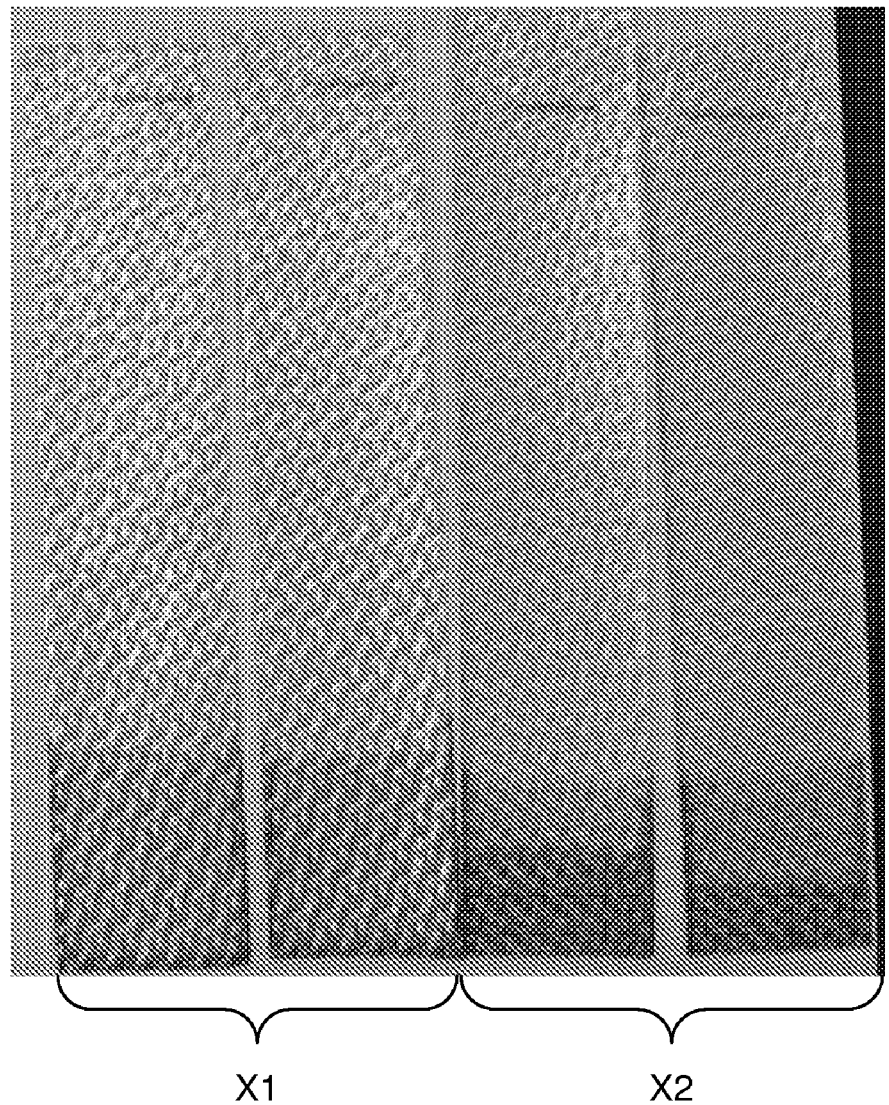
FIG. 3B shows a copy of a photograph of coated specimens, oriented in the fill direction, utilizing saturants in accordance with some embodiments of the present disclosure, after water immersion in accordance with sections 94-98 of ASTM D 751-06.

FIGS. 3A and 3b are copies of photographs showing the water-wicking characteristics of some specimens utilizing the saturants "X1" and X2" (correspondingly labeled "X1" and "X2"). In FIG. 3A, the coated specimens were oriented in the warp direction and in FIG. 3B, the coated specimens were oriented in the fill direction. The results show improved wicking resistance as represented by the extent of discoloration of the specimens, with increasing effective saturant loading. Wicking study was performed in accordance with ASTM D 751.

TABLE 4

Saturant "X1" and "X2" Compositions.

| Component | Commercial Designation | "X1" (pounds) | "X2" (pounds) |
|---|---|---|---|
| Polyurethane | DISPERCOLL ® U 53 | 228 | 228 |
| Carrier | water | 21 | 21 |
| Wetting agent | N-methyl pyrrolidone | 30 | 30 |
| Polyisocyanate | DESMODUR ® DA-L | 18 | 18 |
| Halogenated additive | CALPEL FC-LV | 33 | 33 |
| Cross-linking agent | ZOLDINE ™ XL-29SE | 20 | 33 |
| Total | | 350 | 363 |

Laminates correspondingly designated as "X1" and "X2" were prepared by extrusion-coating a layer of thermoplastic polyurethane, CRE682, available from Cooley, Inc., on one side of each cured, coated fabric, at 6 oz/linear yard. A mixed thermoplastic layer was applied on the other side of the cured, coated fabric by extrusion-coating a mixture of 95 wt % CRE682 thermoplastic polyurethane and 5 wt % CPG940A4 thermoplastic polyurethane from Cooley, Inc., at 8.9 oz/linear yard.

Strips of the laminates were cut into 1 inch×8 inch specimens. Average values of various test results of laminate specimens "X1" and "X2" are listed at Table 5 along with a laminate (labeled as "1") utilizing the saturant as in Example 1. Specimens of each were then welded and evaluated in accordance with ASTM D 751, and after immersion in water at 160° F. after 14 and after 42 days. The 2 inch by 3 inch specimens were prepared by welding strips to have a three inch overlap and cutting to into two inch wide specimens. These were evaluated under tensile load initially and after immersion in water at 160° F. after 14 and after 42 days.

These test results show that various embodiments of the laminates of the present disclosure meet or exceed the requirements for hydrolytic stability for water tanks. Further, specimens utilizing the saturants X1 and X2 provide improved performance properties relative to specimens utilizing saturants "A" to "F".

Further, the water wicking results of the X1 coated specimens were measured to be about 0 in. in the fill direction and about 0.125 in. in the warp direction; and the water wicking results of the X2 coated specimens were measured to be about 0.25 in. in the fill direction and about 0.125 in. in the warp direction. Under a visual examination of the specimens, capillary seepage was noted up the sides of the warp direction specimens. No wicking was observed in the middle of any of the specimens. The data thus shows that the coatings and laminates disclosed herein can be utilized to meet or exceed requirements directed to materials of construction for liquid storage vessels.

TABLE 5

Laminate "X1" and "X2" Properties.

| | Specimen Label | | |
| --- | --- | --- | --- |
| | "1" | "X1" | "X2" |
| Screw Puncture | 184 | 189 | 197.3 |
| Water Wicking | <0.125 | F ~0<br>W ~0 | F ~0.25"<br>W ~0 |
| Weight after saturation | — | 13.6 | 13.6 |
| Total Finished Weight, oz/linear yard | — | 26.9 | 27.7 |
| 1 inch Adhesion, lb/linear inch | 45 | 37.4 | 62.35 |
| 1 inch Adhesion after 14 days immersion in water at 160° F., lb/linear inch | 31 | 38.05 | 57.73 |
| 1 inch Adhesion after 42 days immersion in water at 160° F., lb/linear inch | 3.25 | 35.24 | 37.51 |
| 2 inch × 3 inch tensile, psi | 885 | 420 | 488.5 |
| 2 inch × 3 inch tensile after 14 days immersion in water at 160° F., psi | 850 | 429.05 | 532.0 |
| 2 inch × 3 inch tensile after 14 days immersion in water at 160° F., psi | 185 | 496.5 | 491.35 |

Having now described some illustrative embodiments of the present disclosure, it should be apparent that the foregoing is illustrative and non-limiting. Numerous modifications and other embodiments are within the scope of one of ordinary skill in the art and are contemplated as falling within the scope of the present disclosure. In particular, although many of the examples presented herein involve specific combinations of method acts or system elements, it should be understood that those acts and those elements may be combined in other ways to accomplish the same objectives.

Moreover, it should also be appreciated that the present disclosure is directed to each feature, system, composition, coated composition or other intermediate article, or technique described herein and any combination of two or more articles, features, systems, or techniques described herein, if such are not mutually inconsistent, is considered to be within the scope of the present disclosure as embodied in the claims. Further, acts, elements, and features discussed only in connection with one embodiment are not intended to be excluded from a similar role in other embodiments.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A urethane coating composition, comprising:
    a water-dispersible urethane polymer;
    a hydrophilic polyisocyanate;
    a wetting agent comprising at least one water-miscible organic compound; and
    a water-repellent fluoropolymeric additive comprising a fluoroalkyl acrylate polymer.

2. The coating composition of claim 1, wherein the wetting agent consists essentially of N-methyl-2-pyrrolidone.

3. The coating composition of claim 1, wherein the wetting agent comprises a polar solvent selected from the group consisting of halogenated organics compounds, alcohols, ketones, and formamides.

4. The coating composition of claim 1, wherein the hydrophilic polyisocyanate comprises an aliphatic polyisocyanate adduct of hexamethylene diisocyanate.

5. The coating composition of claim 1, further comprising a cross-linking agent.

6. The coating composition of claim 5, wherein the cross-linking agent comprises a diimide.

7. A method of preparing a urethane-based coating composition, comprising:
    combining an aqueous polyurethane dispersion, water, and a polar aprotic compound to form a premix;
    storing at least a portion of the premix;
    adding a polyisocyanate to the premix to form a urethane-based mixture; and
    mixing a fluoroacrylic polymeric compound into the urethane-based mixture to form the urethane-based coating composition.

8. The method of claim 7, wherein combining the aqueous polyurethane, water, and the polar aprotic compound comprises combining a polyester polyurethane, water, and N-methyl-2-pyrrolidone.

9. The method of claim 7, wherein the combining act further comprises adding a cross-linking agent.

10. The method of claim 7, wherein adding the polyisocyanate to the premix comprises:
    introducing the premix into a mixer;
    agitating the premix; and
    adding an aliphatic polyisocyanate adduct of hexamethylene diisocyanate while agitating the premix.

11. A method of fabricating a laminate, comprising:
    applying a urethane coating composition comprising a water-dispersible urethane polymer, a hydrophilic polyisocyanate, a wetting agent comprising at least one water-miscible organic compound, and a water-repellent fluoropolymeric additive on a fabric;
    curing the urethane coating composition on the fabric to provide a coated fabric; and
    disposing a thermoplastic polymeric material on the coated fabric to create the laminate.

12. The method of claim 11, wherein applying the coating composition comprises dipping the fabric in a bath containing the urethane coating composition to form a dip-coated fabric.

13. The method of claim 12, wherein curing the urethane coating composition comprises:
    drying the dip-coated fabric at a temperature in a range of 200° C. to 400° C.; and
    heating the dried, coated fabric at a temperature of at least 400° C.

14. The method of claim 13, wherein applying the coating composition comprises applying a saturant consisting essentially of an aqueous anionic polyurethane, water, N-methyl-2-pyrrolidone, an aliphatic polyisocyanate adduct of hexamethylene diisocyanate, and a water-repellent fluoroacrylic polymeric additive.

15. The method of claim 13, wherein disposing the thermoplastic polymeric material on the coated fabric comprises co-extruding a thermoplastic polyurethane resin on the coated fabric.

16. The method of claim 11, wherein applying a urethane coating composition comprises preparing a saturant comprising a water-dispersible urethane polymer, a hydrophilic polyisocyanate, a wetting agent comprising at least one water-miscible organic compound, a cross-linking agent, and a water-repellent fluoropolymeric additive.

17. The method of claim 11, wherein applying a urethane coating composition on a fabric comprises preparing a saturant consisting essentially of a water-dispersible urethane polymer, a hydrophilic polyisocyanate, a wetting agent comprising at least one water-miscible organic compound, a diimide, and a fluoroacrylic compound.

18. A method of facilitating fabrication of a water storage vessel comprising:
applying a saturant consisting essentially of an aqueous anionic polyurethane, water, N-methyl-2-pyrrolidone, an aliphatic polyisocyanate adduct of hexamethylene diisocyanate, a diimide, and a water-repellent fluoroacrylic polymeric additive on a fabric;
curing the saturant on the fabric to provide a coated fabric; and
disposing a thermoplastic polymeric material on the coated fabric to create a laminate.

19. The method of claim 18, further comprising delivering the laminate to a water storage vessel fabrication facility.

* * * * *